United States Patent

Bowie

[15] 3,640,513
[45] Feb. 8, 1972

[54] LOW VELOCITY GAS SCRUBBER

[72] Inventor: John S. Bowie, Fortuna, Calif.

[73] Assignee: Bar Investment Company, Inc., Eureka, Calif.

[22] Filed: Aug. 26, 1968

[21] Appl. No.: 755,085

[52] U.S. Cl. .................................261/78, 261/109, 261/117
[51] Int. Cl. ................................................B01d 47/06
[58] Field of Search ................261/108, 118, 76, 78; 85/233

[56] References Cited

UNITED STATES PATENTS

| | | | |
|---|---|---|---|
| 1,117,309 | 11/1914 | Bentz | 55/223 |
| 1,366,712 | 1/1921 | Brindle et al. | 261/114 |
| 2,057,579 | 10/1936 | Kurth | 55/233 |
| 2,284,317 | 5/1942 | Greenberg | 261/117 |
| 2,709,580 | 5/1955 | Kameya | 261/118 |
| 2,733,055 | 1/1956 | Ophuls et al. | 261/113 |

Primary Examiner—Frank W. Lutter
Assistant Examiner—Bernard Nozick
Attorney—Townsend and Townsend

[57] ABSTRACT

A low velocity horizontal gas scrubber in which gases to be scrubbed are led into a chamber in which there are baffles mounted across the gas flow path. The baffles have substantial orifices, with high pressure water spray nozzles mounted on the baffles spraying water counter to the flow of gases. A scrubbing unit made up of wooden slats stacked vertically and extending across the chamber in rows with sprays mounted above the slats to keep them wet occupies the balance of the chamber. A vertical baffle extending across the rear of the scrubber is vertically adjustable for equalizing gas flow through the upper and lower portions of the scrubber unit. The gases are exhausted from the unit through a stack with a water spray counter to the gas flow. A trough in the floor of the chamber collects the water and particles for discharge.

8 Claims, 4 Drawing Figures

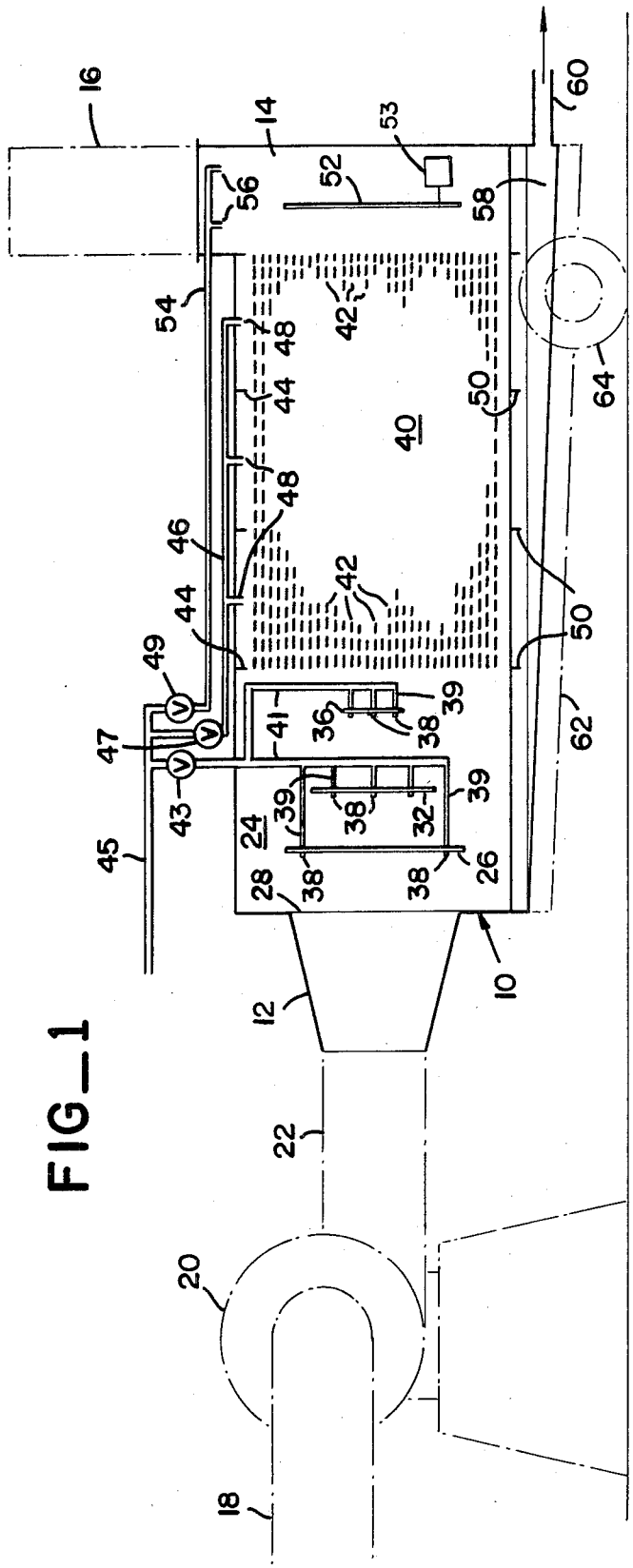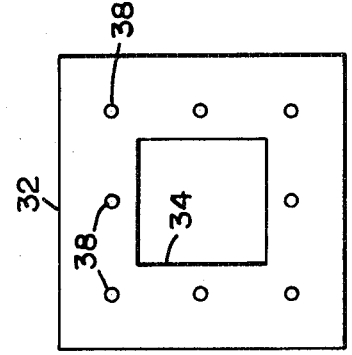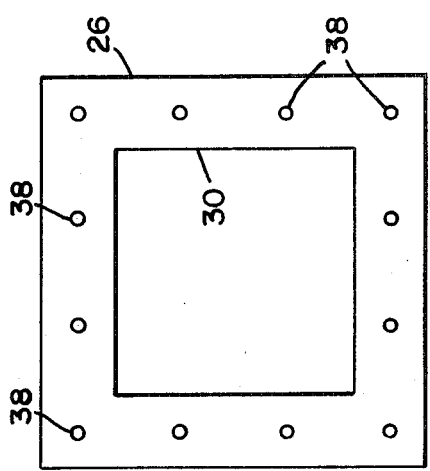
INVENTOR.
JOHN S. BOWIE
BY
Townsend and Townsend
ATTORNEYS

LOW VELOCITY GAS SCRUBBER

This invention relates to apparatus for cleaning exhaust gases and, more particularly, to a low velocity gas scrubber.

Gas scrubbers of various kinds are well known in the art. The usual apparatus for cleaning industrial exhaust gases comprises one or more vertical wash towers in which the gas is passed upward through the tower while various spray nozzles wash the gas as it rises in order to remove particles and soluble gases from the exhaust gases. There are many variations of the well-known towers including baffling arrangements of many varieties. There are both high velocity and low velocity cleaning towers, the low velocity variety usually including substantial baffling arrangements and the high velocity system usually including a venturi arrangement as part of the gas flow system.

While the high velocity system may often be more efficient with respect to removal of a higher proportion of entrained particles than the usual low velocity system, there is a substantially greater amount of power required to run the blowers which force the exhaust gases through the cleaning system. A further disadvantage of the high velocity system lies in the high rates of wear on the parts of the system resulting from erosion through the action of the entrained particles moving at such substantial velocities.

The usual low velocity system, while it does not have the tremendous erosion problems of the usual high velocity system is often inefficient so that a single pass through a cleaning chamber may not be sufficient to remove substantially all the particles from the exhaust gases.

The present invention, a low velocity, horizontal exhaust gas scrubber avoids the problems of the high velocity system and, at the same time, is extremely efficient so that a single pass of exhaust gases through the scrubber results in the removal of substantially all the particulate matter from the exhaust gases.

Since the unit is designed to scrub low velocity gases it may be made from comparatively lightweight materials, thin sheet metal or reinforced plastics. The horizontal arrangement of the components, together with the comparative lightweight of the overall unit permits a unit to be mounted on a wheeled platform such as a trailer bed. Thus, the scrubber may be brought to a site at which a temporary asphalt plant has been located, or to the site of a permanent or semipermanent sawmill or other industrial plant having an exhaust gas problem.

The horizontal arrangement of the unit has the advantage of permitting mobility but leads to certain disadvantages in the functioning of the scrubber. Since the gases which pass into the scrubber are hot, they rise to the upper portion of the chamber. Thus, the gas flow rate through the upper portion of the chamber will tend to be greater than that through the lower portion. Thus, the present invention includes a vertically movable baffle adjacent the rear of the scrubber unit for equalizing the gas flow through the upper and lower portions of the scrubber.

In the present invention there is a cleaning chamber of substantial size and arranged horizontally, the entrance end of which is utilized as an expansion chamber. The expansion chamber portion of the apparatus is provided with a series of unique baffles having spray nozzles affixed thereto so that the incoming exhaust gases are in countercurrent flow to the wash water being sprayed. The baffles aid in slowing down the entering exhaust gases causing them to flow around and through the baffle since the baffles closest to the entrance have substantial apertures in the center to permit the gases to pass through and impinge on the subsequent baffle. After passing the spray-baffle arrangement the exhaust gases pass through a unique scrubber unit comprising a plurality of horizontally disposed, spaced-apart wooden slats which are subjected to a constant spray of water from above in order to maintain the wooden surfaces completely wet. The exhaust gases passing over, around, and through the rows of wetted wooden slats are freed from substantially all the entrained particles. As the exhaust gases pass out of the scrubber unit they are partially deflected by the equalizing baffle vertically movable behind the scrubber unit. The vertical position of the baffle is adjustable in order to equalize the flow of gases through the upper and lower portions of the scrubber unit. The vertical position of the baffle may be changed to accommodate the varying conditions of gas temperatures, flow rates, water spray conditions and the like which affect the flow of gases through the upper and lower portions of the scrubber.

After passing through the wooden slat beds the exhaust gases pass into the exhaust portion of the chamber, are collected and then passed upward through a stack which is provided with additional spray nozzles for a final washing of the gases prior to their passing out of the apparatus. In order to facilitate the removal of the particulate matter washed out of the exhaust gases passing through the apparatus there is provided a collecting trough into which the sprayed water and particles drain in order to be removed from the wash chamber. Because of the unique construction of the present apparatus, it is possible to mount the entire unit on a trailer so that it can be moved from site to site depending upon the requirements for an exhaust gas scrubber. Thus, it is no longer necessary to permit dust and particle laden gases to escape to the atmosphere since it will be an easy matter to bring one of the scrubbers of the present invention to the plant requiring the exhaust gases to be cleaned.

The scrubber unit which has been described as comprising a plurality of wooden slats, may also comprise a plurality of members made of fiber glass-reinforced plastic or unreinforced plastic, cement-asbestos strips, charcoal, expanded metal or flat metal strips or similar materials. The primary purpose for the utilization of wood or other members is to provide substantial surface area to be exposed to the wetting sprays to provide a filtering medium for low velocity exhaust gases.

In the drawing:

FIG. 1 is an elevational view of the exhaust gas scrubber of the present invention;

FIG. 2 is a detail of the entrance baffle;

FIG. 3 is a detail of the intermediate entrance; and

FIG. 4 is a detail of the final entrance baffle.

Referring now more particularly to the drawing in which the same reference numerals refer to the identical parts in each of the several views, the gas scrubber of the present invention is shown generally in FIG. 1. The gas scrubber comprises a chamber 10 having an inlet adapter 12 for connecting the chamber to a source of exhaust gases and an outlet chamber 14 for discharging the cleaned exhaust gases to which a stack 16 is connected in order to permit the gases to rise more readily into the atmosphere. The dust laden exhaust gases are taken from a suitable conduit 18 through a blower 20 and from the blower outlet 22 into the inlet adapter 12.

In a typical installation the blower 20 would be a 75–100 HP blower having a capacity of approximately 30,000 c.f.m. If the blower outlet 22 were approximately 36 inches in diameter the exhaust gases would be passing through the blower outlet at approximately 40 miles per hour. As the hot, dirty gases pass from the outlet pipe 22 into the inlet adapter 12 they begin their expansion process. The inlet portion of the chamber 10 is the air expansion and deceleration chamber 24. In this expansion chamber 24 are baffles, together with high pressure spray nozzles. The forward baffle 26 is of dimensions which are somewhat larger than the entrance orifice 28 where the inlet adapter 12 is connected to the entrance portion of the expansion chamber 24. The forward baffle 26 has an orifice 30 concentric to the outside edges of the baffle and smaller than the entrance orifice 28. Those gases which pass through the orifice 30 impinge upon the intermediate baffle 32 which has a similar shape to the forward baffle 26 and is also provided with an orifice 34 to permit some of the exhaust gases to pass through the intermediate baffle and impinge upon the rear baffle 36. Rear baffle 36 is at the rear portion of the deceleration chamber 24 and is located just in front of the scrubbing slats.

Each of the baffles suspended in the expansion chamber 24 is provided with a plurality of high-pressure spray nozzles 38. Each nozzle is pointed in the direction from which the unwashed gases flow in order to thoroughly wet the incoming gases and start the scrubbing process. In addition, since the air and the water spray through the nozzles are in counterflow, the water spray through the nozzles tends to reduce the velocity of the gases as they pass into the scrubber. The nozzles 38 are connected through intermediate supply pipes 39 to the high pressure water lines 41. These lines are supplied through valve 43 from the main water supply 45.

The partially washed, expanded gases pass from the expansion chamber 24 into the gas scrubber unit 40. This scrubber unit comprises a plurality of horizontally arranged wooden slats 42. In the preferred embodiment the slats are made of redwood and are approximately three-eighths inch thick by 1½ inches wide and 8 feet long to cover the entire width of the chamber 10. The slats are spaced approximately 2 3/16 inches on the horizontal centers and 1⅞ inches on vertical centers. Directly above the redwood slats and fastened to the roof of the chamber 10 is a plurality of baffles 44 extending across the width of the chamber in order to force the gases to be scrubbed in and around the wetted slats 42. The slats are kept wet by means of a low pressure water supply pipe 46 supplying a plurality of low pressure spray heads 48. Supply pipe 46 is fed through a pressure reducing valve 47 from the main water supply 45. These spray heads 48 are evenly spaced in the roof of the chamber 10 above the slats so that the slats are kept wet all during the passage of the gases through the chamber. Additional baffles 50 are located along the bottom of the slats in order to help force the gases to be scrubbed through the scrubber.

After the gases have passed through the scrubber 40 they pass into the outlet chamber 14. Located substantially in the center of the outlet chamber is an equalizing airflow baffle 52 movably mounted so that it may be raised or lowered in the chamber by means 53. This baffle 52 is placed in this position in order to equalize the airflow through the upper and lower sections of the scrubber unit 40. Near the upper exit of the chamber 14 there is provided a high pressure stack spray comprising a supply pipe 54 for high pressure water from a valve 49 connected to the main supply pipe 45, and a plurality of high pressure nozzles 56. These nozzles spray water in countercurrent flow against the scrubbed gases passing into the outlet chamber and into the stack 16. These nozzles accomplish the final cleaning of the gases before they pass into the stack. The water from the nozzles 56 also serves to help wash down the slurried particles which have accumulated at the bottom of the chamber.

The bottom of the chamber slopes from its inlet to its outlet and in addition slopes from the side edges to the center of the chamber where a trough 58 is formed in order to carry the waste water and the particles washed from the gases out of the chamber. The particles and waste water from the high pressure nozzles 38 and from the water which runs over the scrubber 40 accumulates in the trough 58. The water and particles together form a thin slurry which passes by gravity along the trough 58 to the discharge outlet 60. Additional water which cascades down from the high pressure nozzles 56 helps keep the slurry agitated and wash it out through the outlet nozzle 60 from whence it is conveyed by appropriate means to a settling basin or other discharge arrangement.

Because of the unique layout of the gas scrubber of the present invention, the walls of the chamber 10 may be made of thin sheet metal or lightweight sheets of reinforced plastics. As a result, a typical scrubber which may be some 22 feet in length is light enough to be mounted on a trailer frame 62 which has wheels 64 mounted on it to permit the scrubber to be moved from job to job.

As has been noted, the gases in the typical installation enter the unit at a velocity of approximately 40 m.p.h. After passing through the inlet adapter 12 and the baffle spray arrangement in the deceleration chamber 24, and as a result of the back pressure caused by the scrubber unit 40 the velocity of the gases entering the scrubber unit has been reduced to approximately 5 m.p.h. Thus, the gases to be scrubbed pass through the horizontal and vertical gas flow paths in the scrubber unit at a relatively low velocity for the removal of substantially all the entrained particles.

I claim:

1. A low velocity gas scrubber comprising: an elongate horizontal housing defining a chamber having an inlet at one end and an outlet at the other end for passing gases to be scrubbed along the elongate axis thereof; a plurality of baffles mounted in the chamber adjacent the inlet for decreasing the velocity of the gases after entering the chamber; means at the baffles for spraying water into contact with the gases counter to the direction of gas flow; a scrubber unit in the chamber between the baffles and the outlet said scrubber unit including a plurality of rows of horizontal slats defining a plurality of horizontal and vertical intercommunicating gas flow paths through which the gases pass at a substantially lower velocity than that at which they enter the inlet; means for wetting the slats of the scrubber unit during passage of gases therethrough; and vertical baffle means in the chamber at the outlet and adjacent the scrubber unit, said baffle means being vertically movable to impede gas flow through portions of the scrubber unit to equalize the flow of gases through the upper and lower portions of the scrubber unit.

2. The gas scrubber of claim 1 and including means at the bottom of the chamber for collecting the water from the sprays; and means for discharging the accumulated water.

3. The gas scrubber of claim 1 including baffles mounted adjacent the extended surfaces of the scrubber unit in the chamber for forcing substantially the gases to be scrubbed through the scrubber unit.

4. The gas scrubber of claim 1 and wherein the scrubber unit comprises a plurality of horizontally disposed, elongate wooden slats, said slats arranged in vertical columns across the width of the chamber, a plurality of said columns extending along a substantial portion of the length of the chamber, adjacent slats in the column together with adjacent slats in the columns forming alongside horizontal gas flow paths, the columns being spaced apart from each other to form vertical flow paths.

5. A low velocity gas scrubber comprising: a substantially horizontal housing defining a chamber having an inlet at one end and an outlet at the other end and comprising an expansion section adjacent the inlet, a scrubbing section, and an outlet section; an inlet adapter for connecting a source of gases to be cleansed to the expansion section of the chamber; a plurality of vertically disposed baffles in the expansion section, each of said baffles having a plurality of high pressure water spray means mounted thereon, said spray means directed toward the gas inlet of the chamber; a plurality of rows of horizontally disposed spaced-apart wooden slats substantially filling the scrubbing section of the chamber; a plurality of low pressure water spray nozzles disposed above the slats for directing a flow of water over the slats; a vertically movable, vertically extending baffle means mounted in the outlet section of the chamber adjacent the slats to equalize the gas flow through the upper and lower scrubber portions of the scrubber section; a stack connected to the outlet section for exhausting the scrubbed gases; and at least one high pressure water spray means mounted adjacent the entrance to the stack, said spray means directing its spray counter to the gas flow into the stack.

6. The gas scrubber of claim 5 and wherein the baffle closest to the inlet in the expansion section has larger dimensions than the inlet opening, said baffle having an orifice therein substantially smaller than the inlet opening which permits incoming gases to pass through the baffle as well as around the circumference thereof, and wherein each succeeding baffle in the gas flow path has an orifice therein substantially smaller than the orifice in the preceding baffle and has larger overall dimensions than the orifice preceding it, and wherein the baffle adjacent the forward end of the slats in the scrubbing section is solid.

7. The gas scrubber of claim 5 and including a trough formed in the floor of the chamber, extending from the inlet end to the outlet end and sloping downward toward the outlet end; and a discharge portion in the chamber wall adjacent the lower end of the trough for discharging accumulated water from the trough.

8. The gas scrubber of claim 5 and wherein the horizontal housing is mounted on an elongate mobile platform.

* * * * *